Aug. 13, 1935.   J. G. CAPSTAFF   2,011,353
APPARATUS FOR COPYING MOTION PICTURE FILMS
Filed June 24, 1933

Inventor:
John G. Capstaff,
Newton M. Perrins.
By Rolla X. Carter
Attorneys

Patented Aug. 13, 1935

2,011,353

UNITED STATES PATENT OFFICE 2,011,353

APPARATUS FOR COPYING MOTION PICTURE FILMS

John G. Capstaff, Rochester, N. Y., assignor to Eastman Kodak Company, Rochester, N. Y., a corporation of New York Application June 24, 1933, Serial No. 677,428

2 Claims. (Cl. 88—24)

The present invention relates to photographic printing and particularly to the copying of motion picture film with a change in the number of pictures per second.

In moton picture work it is quite frequently desirable to provide copies of a film taken at a given number of frames per second which may be projected at a different number of frames per second without a change in the rate of action. Also it is sometimes desirable in taking a motion picture in which part of the scene consists of another motion picture projected onto a screen to run the camera at a speed different from that of the projector but without altering the rate of action.

It is accordingly an object of the present invention to provide apparatus with which these desirable steps may be accomplished.

Other objects and advantages of the invention together with a preferred embodiment as will appear more fully hereinafter will become apparent from the following description when read in connection with the accompanying drawing.

In the accompanying drawing wherein I have shown preferred arrangements embodying the principles of this invention and which drawing is intended solely for illustrative purposes.

Certain features relate to apparatus for copying motion picture film by projection printing while other features relate to the taking of a motion picture in which part of the scene consists of another motion picture projected onto a screen.

Figure 1:
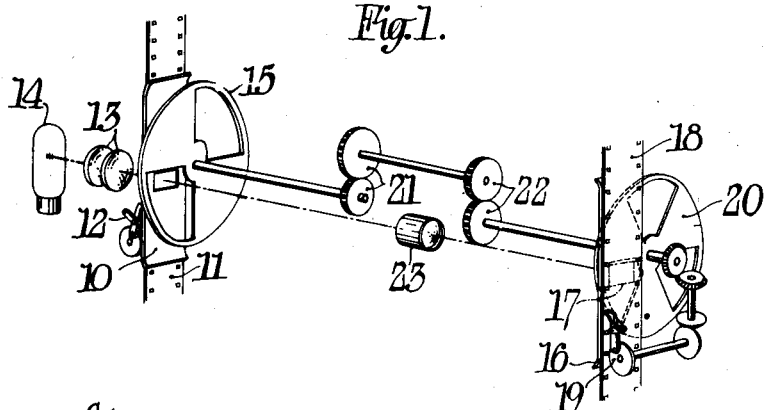
Fig. 1 is a perspective view diagrammatically showing a projection printer constructed in accordance with the invention.

There is shown in Fig. 1 of the drawing a specific embodiment of the invention suitable for printing a picture film taken at 24 frames per second so as to obtain a picture film which can be projected at 16 frames per second without a change in the rate of action. The projection head of the printer which includes the usual gate member 10 past which a film 11 to be copied is intermittently drawn by a pulldown member 12 and a condenser 13 for concentrating light from a source 14 on the gate in member 10, is provided with a sector shutter 15 having four 90-degree sectors, two open and two closed as shown. The taking head which includes a guide 16 provided with an exposure window 17 upon which the frame in the gate 10 is imaged by an objective 23 and past which a sensitive film 18 is adapted to be advanced intermittently by a suitable pulldown mechanism 19, is provided with a shutter 20 having six sectors, three open and three closed alternating as shown.

The shutter 15 is geared to the shutter 20 through gears 21 and 22 in such manner that the shutter 15 makes 24 revolutions to each 16 revolutions of the shutter 20. The pull down 12 is mechanically connected to the shutter 15 and advances the film 11 one frame for each revolution of the shutter 15. Likewise, the pull down 19 which is mechanically connected to the shutter 20 advances the sensitive film 18 one frame for each revolution of the shutter 20. The two shutters 15 and 20 are synchronized so that their dark and light phases exactly coincide. This is possible because of their different rates of rotation, the shutter 15 making one half revolution during the time the shutter 20 is making one-third of a revolution.

The embodiment just described is suitable for copying a film taken at 24 frames per second to obtain a film for projection at 16 frames per second without a change in the rate of action. The general solution for copying at other film speeds where the number of frames for a given amount of action is to be either increased or decreased the number of open sectors in the shutters are inversely proportional to the number of frames on the corresponding film. The number of closed sectors in each shutter must of course be equal to the number of open sectors and preferably the ratio of the numbers of frames is reduced to its lowest terms to determine the actual number of open and closed sectors.

The general principle of the above described system is also applicable to the taking of a motion picture in which part of the scene consists of another motion picture projected onto a screen. One suitable arrangement of this type is shown schematically in Fig. 2. A subject 25 which is to be photographed by a camera C is positioned in front of a screen 26 upon which any suitable additional subject matter is displayed by a projector P. The camera C and projector P are coupled together in any well known manner as by a cable 27 and their shutters are designed in accordance with the principles above set forth. This arrangement makes it possible to use as part of a scene being photographed with a certain film speed a picture projected with a different film speed and this without any change in the rate or action.

Figure 2:
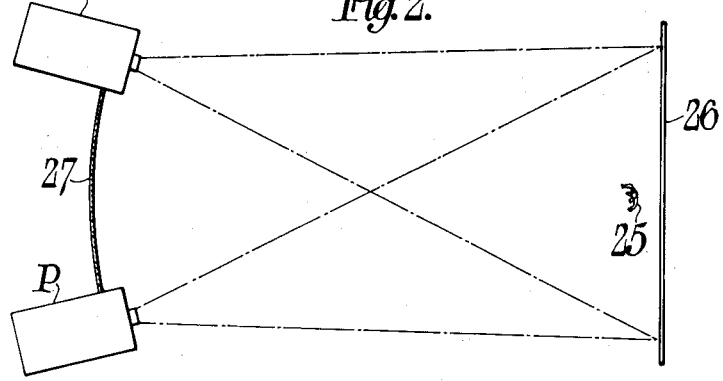
Fig. 2 is a schematic view showing the invention as applied to the taking of a motion picture in which part of the scene consists of another motion picture projected onto a screen.
Figure 4:
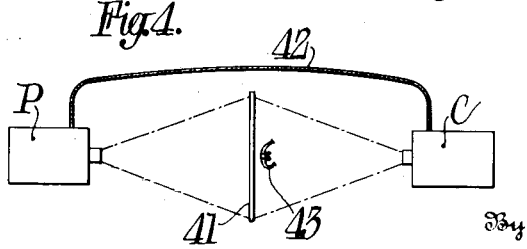
Fig. 4 is a schematic view showing a copying arrangement using a translucent screen.

Another suitable arrangement and one which in practice is preferred to the one shown in Fig. 2 is schematically shown in Fig. 4. As shown in this figure, the projector P, used to project from a film images onto a translucent screen 41, is mechanically coupled to the camera C in any well-known manner as by a cable 42. The camera C is positioned on the opposite side of the translucent screen 41 from the projector and additional subject matter such as an actor 43 may be introduced between the screen 41 and the camera C as is well known in the art.

Insofar as the present invention is concerned the operation of the system shown in Fig. 2 is identical to that of Fig. 1 and will not be explained separately. Assuming that each of the films 18 and 11 have just been advanced one frame and the shutters have rotated to their respective positions shown in Fig. 1. The illuminated frame of the picture film 11 is imaged by the objective 23 onto the frame of the sensitive film 18 behind the window 17 to start the exposure of this frame of the sensitive film. As the shutters 15 and 20 continue to rotate they intercept the printing beam for a short interval and due to their different angular speeds the next open sector of each shutter will simultaneously move into the light beam and thereby further expose the sensitive film 18 to light from the same frame of the picture film 11 as before. During the next succeeding interruption of the light beam the shutter 15 on the projecting head will have completed a revolution and the pull down 12 will operate to advance another frame of the film 11 into projection position in the gate 10. Since the taking head shutter 20 has not completed a revolution the raw film 18 will not be advanced and during the next printing period the new picture frame will be imaged on the partly exposed sensitive frame. However, this new picture frame will in ordinary practice differ but slightly from the preceding picture frame and will not degrade the picture projected therefrom. When the light beam is intercepted as in the last mentioned exposure the taking head shutter will have completed a revolution and the pull down mechanism 19 will function to advance an unexposed portion of the raw film 18 into position behind the exposure window 17 where it will receive one exposure from the picture frame then in the gate 10 and two exposures from the next succeeding picture frame.

From the above it is seen that a given amount of action has been condensed into a lesser number of frames without omitting any of the action contained in the original film. This not only results in a marked economy in film but makes possible the adaptation of a picture for projection at a rate different from the one originally intended.

Figure 3:
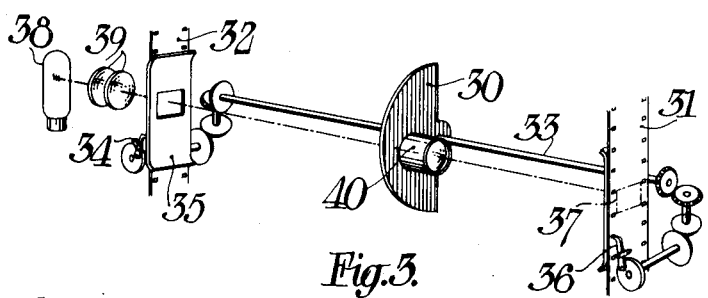
Fig. 3 is a perspective view, diagrammatically shown, of a projection printer provided with a single shutter member and constructed to operate in accordance with the invention.

It is also possible by means of this invention to compress or expand the action in any desired ratio in a printer using a single shutter 30 as shown in Fig. 3. If the shutter 30 has one open and one closed sector each of 180 degrees and it is desired to obtain a film 31 for projecting at a rate of 24 frames per second from an original film 32 taken at 16 frames per second it is only necessary to advance the original film 32 during the dark phase of every third revolution of the shutter 30 and to advance the sensitive film 31 during the dark phase of every second revolution of the shutter 30. Thus the action which occupies 16 frames on the original film 32 will be expanded into 24 frames on the copy film 31. Any suitable mechanism may be employed for operating the shutter 30 and the pull down means in proper timed relation. The mechanism diagrammatically shown in Fig. 3 includes the shutter 30 positioned at any convenient point between the light source and the exposure window and mounted on a shaft 33 which is adapted to be driven in any well known manner not here shown. The shaft 33 is so geared to a pull down 34 that the film 32 in the gate member 35 is advanced a single frame every third revolution of the shaft 33. A taking head pull down 36 is so geared to the shaft 33 that the sensitive film 31 is advanced a single step behind an exposure window 37 every second revolution of the shaft 33. This conventional optical system including a lamp 38, condenser 39 and an objective 40 is shown diagrammatically but it will be understood that any well known system may be used and that the various parts of the printer as well as of the printer shown in Fig. 1 will be properly encased to exclude extraneous light.

It is to be understood that the invention is not restricted to the specific embodiments shown and described since these have been chosen for the purpose of illustrating the invention and many modifications will readily suggest themselves to those skilled in the art. Any desired number of shutter sectors may be used and in the general case if $$\frac{M}{N}$$

is the ratio of the number of frames for a given amount of action on the original to the number of frames on the print then the original is advanced during every Nth dark phase of the shutter and the sensitive film during every Mth dark phase. Preferably but not necessarily $$\frac{M}{N}$$

is reduced to its lowest terms.

While I have illustrated and described my invention as applied to printing at a 1 to 1 ratio it will be obvious that the printing of the pictures may be done on an altered scale without departing from the spirit of my invention, the scope of which is pointed out in the appended claims.

What I claim as new and desire to secure by Letters Patent of the United States is:—

1. In apparatus for copying motion picture film with a change in the number of frames for equal action, a projecting mechanism including a light source, an apertured plate for supporting a picture film in a light beam supplied by the source, a first shutter member provided with a plurality of equal open and closed sectors and adapted to be rotated uniformly during operation of the printer, intermittent film feeding means actuated in timed relation with said first shutter member for advancing the picture film a single frame during a predetermined part of each revolution of said first shutter member, an exposure window, an objective for projecting on the exposure window an image of the frame of the picture film positioned in said apertured plate, a second shutter member provided with a plurality of equal open and closed sectors and adapted to be rotated uniformly in front of said exposure window, intermittent film feeding means actuated in timed relation with said second shutter member and operative to advance a sensitive film past said exposure window a single frame during a predetermined part of each revolution of said second shutter member, means including a mechanical coupling for causing said first and second shutter members to rotate in synchronism and at different individual speeds, the speeds of the two shutters being inversely proportional to the number of sectors in the respective shutter members, whereby the ratio between the number of frames on the two films representing equal action is equal to the ratio between the speeds of their respective shutter members.

2. Photographic printing apparatus for condensing the action contained in a given number of frames on an original motion picture film into a smaller number of frames on a sensitive motion picture film being copied comprising a support having a gate adapted to hold an original film in a beam of light, an exposure window for supporting a sensitive film, means for imaging on the sensitive film in said window the picture on the original film in said gate, means for periodically interrupting the light falling on the exposure window, and means coupled to the light interrupting means for advancing the original film a single frame during every second period the light is interrupted, and means coupled to the light interrupting means for advancing the sensitive film a single step during every third period the light is interrupted, whereby the action contained in three frames on the original film is recorded on the sensitive film in two frames.

JOHN G. CAPSTAFF.